July 8, 1941.  A. B. KNIGHT  2,248,430
GLASS WORKING MACHINE
Filed Jan. 28, 1938   5 Sheets-Sheet 1
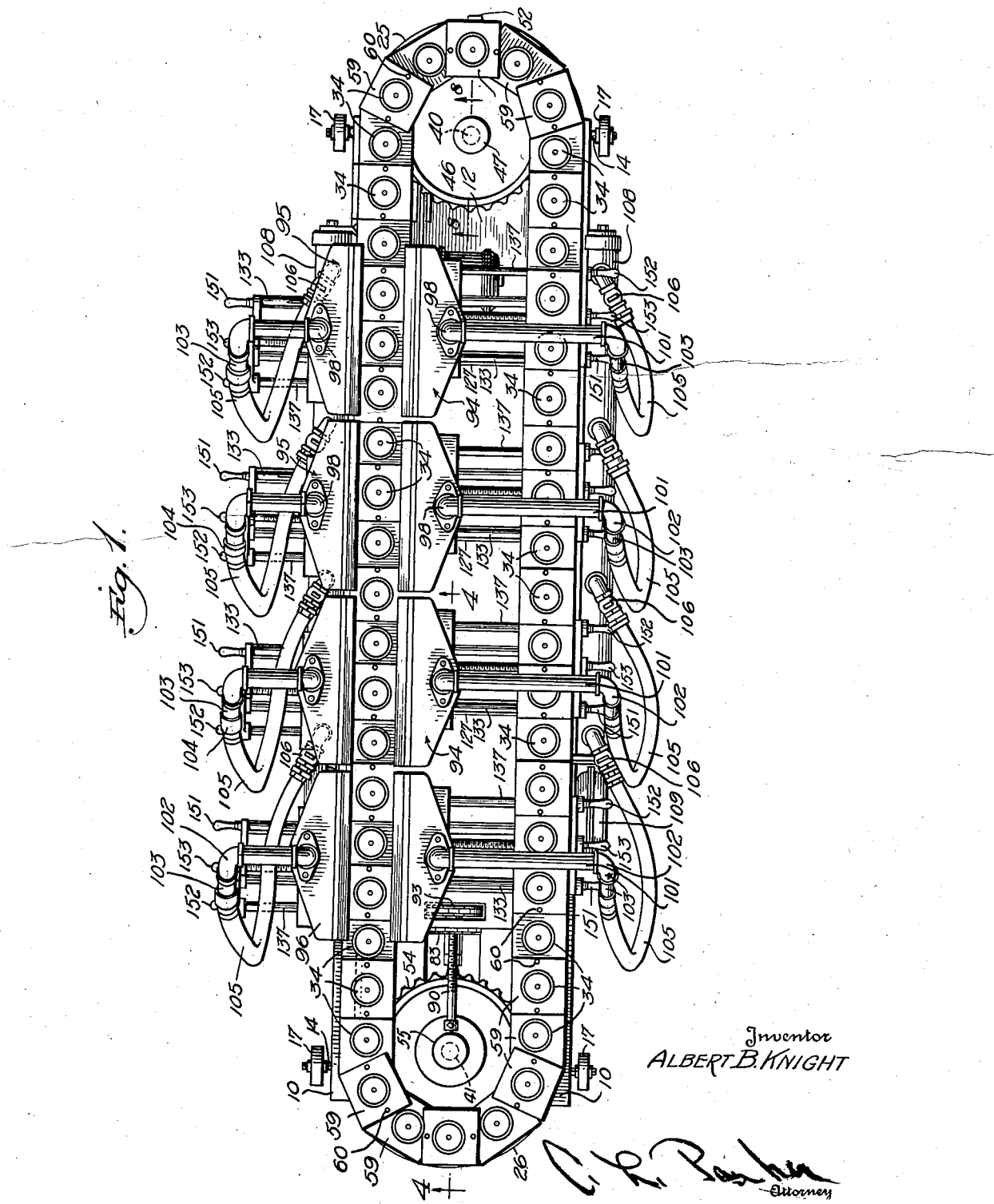
Inventor
ALBERT B. KNIGHT

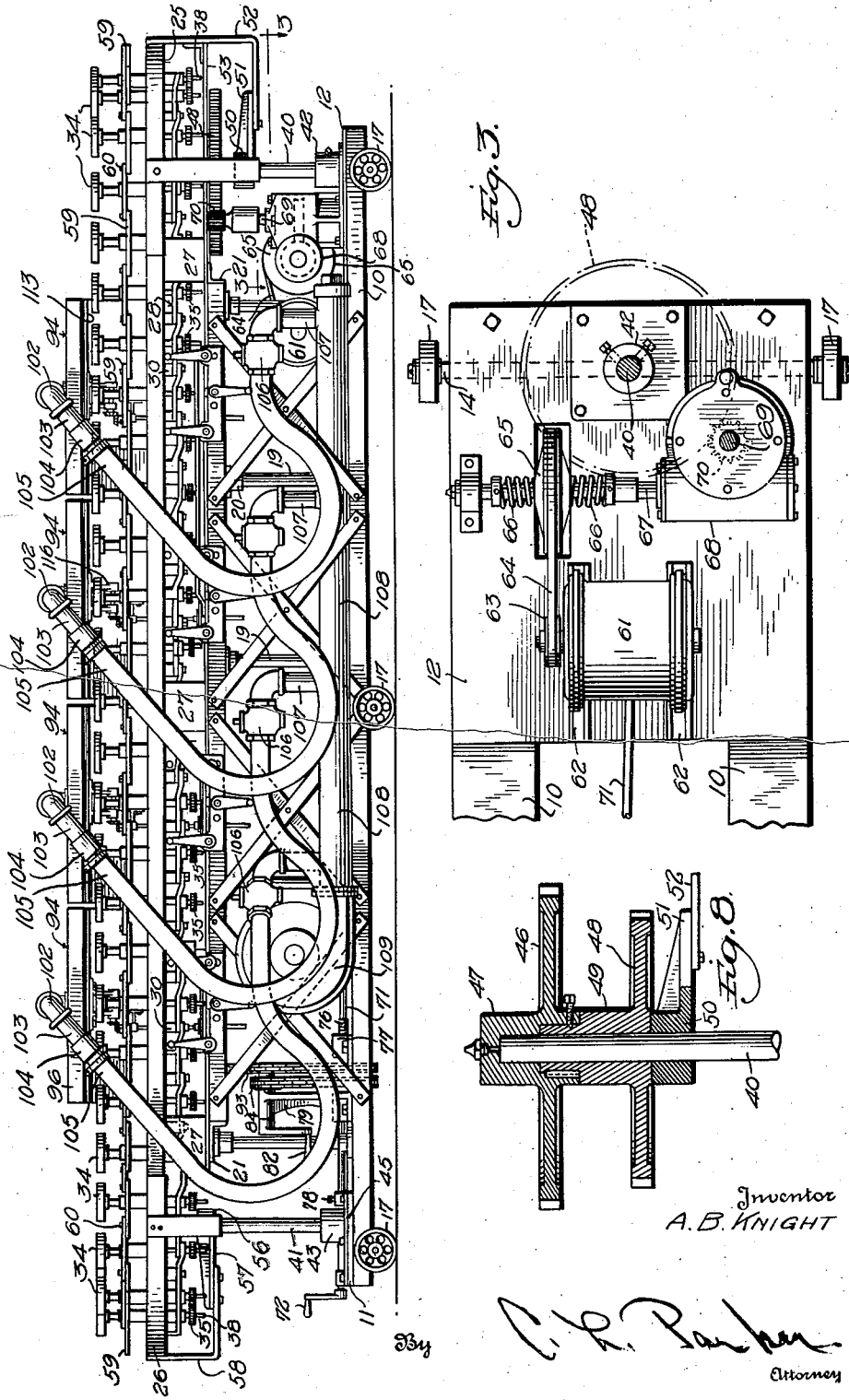

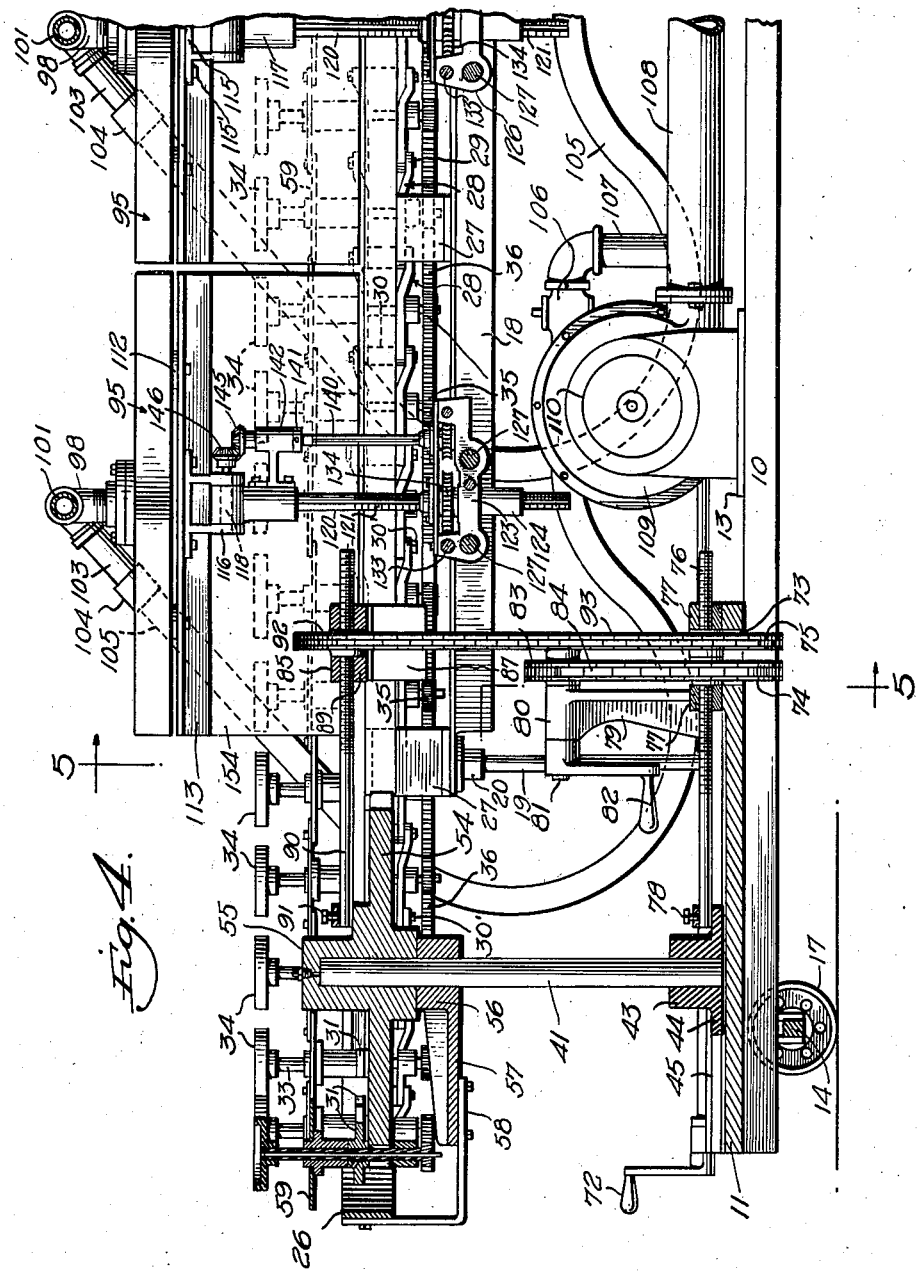

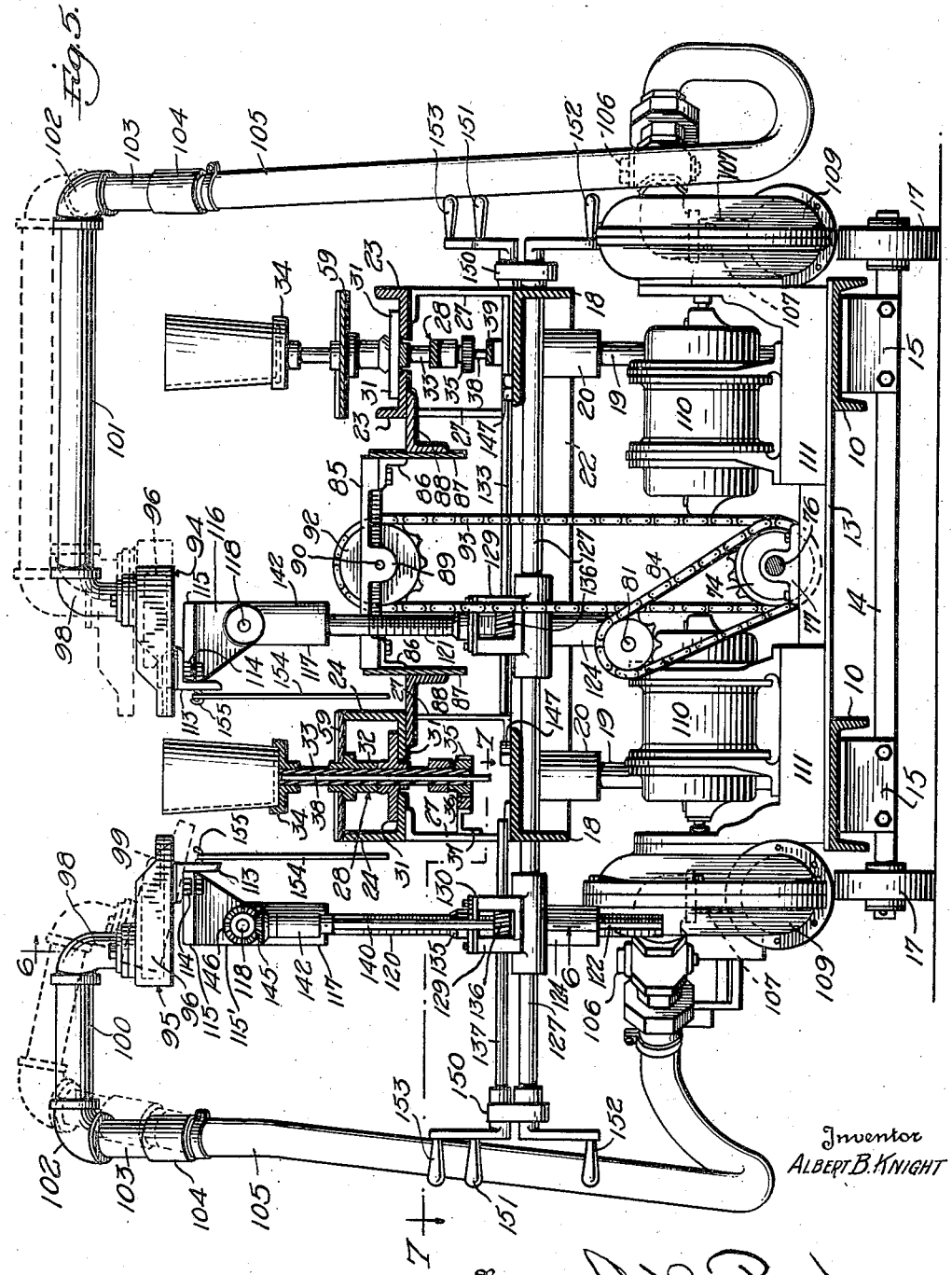

July 8, 1941.  A. B. KNIGHT  2,248,430
GLASS WORKING MACHINE
Filed Jan. 28, 1938  5 Sheets-Sheet 5

Inventor
A. B. KNIGHT

Patented July 8, 1941

2,248,430

UNITED STATES PATENT OFFICE 2,248,430

GLASS WORKING MACHINE

Albert Breakenridge Knight, Fairmont, W. Va.

Application January 28, 1938, Serial No. 187,529

13 Claims. (Cl. 49—58)

This invention relates to glass working machines, and more particularly to a continuously operating machine for glazing and/or polishing glassware of various shapes and sizes.

In my prior Patents Nos. 1,364,939, granted January 11, 1931, and 1,562,341, granted November 17, 1925, I have shown and described machines adapted for glazing and polishing articles of glassware, and particularly tumblers and similar articles, the ranges of shapes and sizes of the articles of glassware on which the machines are adapted to work being somewhat limited because of the inherent characteristics of the machines. The forms of apparatus disclosed in the prior patents referred to employ conveying means formed of chain links each of which is provided with a vertical spindle having a glass supporting cup at its upper end and a pinion at its lower end by means of which the spindle may be turned to rotate the glassware during the glazing and burning operations. Each link of the conveying chain is provided with oppositely extending horizontal lugs supported by and movable along oppositely arranged trackways. Aside from being vertically adjustable, the burners of the prior patents are limited in the manner in which the flames of the burners are directed against the ware.

An important object of the present invention is to provide a novel apparatus of the character referred to which possesses a far greater degree of flexibility to permit the apparatus to be employed for glazing and/or polishing glassware of greatly varying shapes and sizes such as different types of tumblers, plates and dishes of numerous different sizes.

A further object is to provide a machine of this character wherein a number of burners is employed each of which is adapted to direct its flames as may be desired in order that the various burners may cooperate with each other during the passage of an article of glassware through the machine to effectively glaze and/or polish the ware regardless of the shape or size thereof.

A further object is to provide means for conveying successive articles of glassware between batteries of burners each of which is mounted for universal adjustment according to the shape and size of the article whereby complete glazing and polishing of an article may be accomplished within the limits of a relatively short conveyor section.

A further object is to provide an apparatus of the character referred to wherein each burner is supported in position by a single support and is adapted to partake of three different movements, namely, vertical movement to adjust for the height of an article, horizontal movement whereby the burner may be moved toward and away from the ware according to the diameter of the latter, and angularly to direct the flames from the burner to any desired part of the ware.

A further object is to provide novel means for controlling the burner adjustment by means of handles arranged exteriorly of the apparatus to render them readily accessible at points where the operator will not be subjected to any of the heat from the burners.

A further object is to provide conveying means in the form of a chain similar to the structures of the chains of the prior patents referred to, together with novel means for taking up slack in the chain.

A further object is to provide novel combustible fluid supply means for the burners whereby a single blower and manifold is adapted to supply a gaseous mixture to all of the burners at one side of the apparatus through flexible connections, thereby permitting the various adjustments of the burners to take place.

A further object is to provide novel means for protecting certain working parts of the apparatus from the direct action of flames from the burners when the latter are arranged in certain positions.

Other objects and advantages of the invention will become apparent during the course of the following description.

In the drawings I have shown one embodiment of the invention. In this showing:

Figure 1 is a plan view of the apparatus,

Figure 2 is a side elevation of the same,

Figure 6:
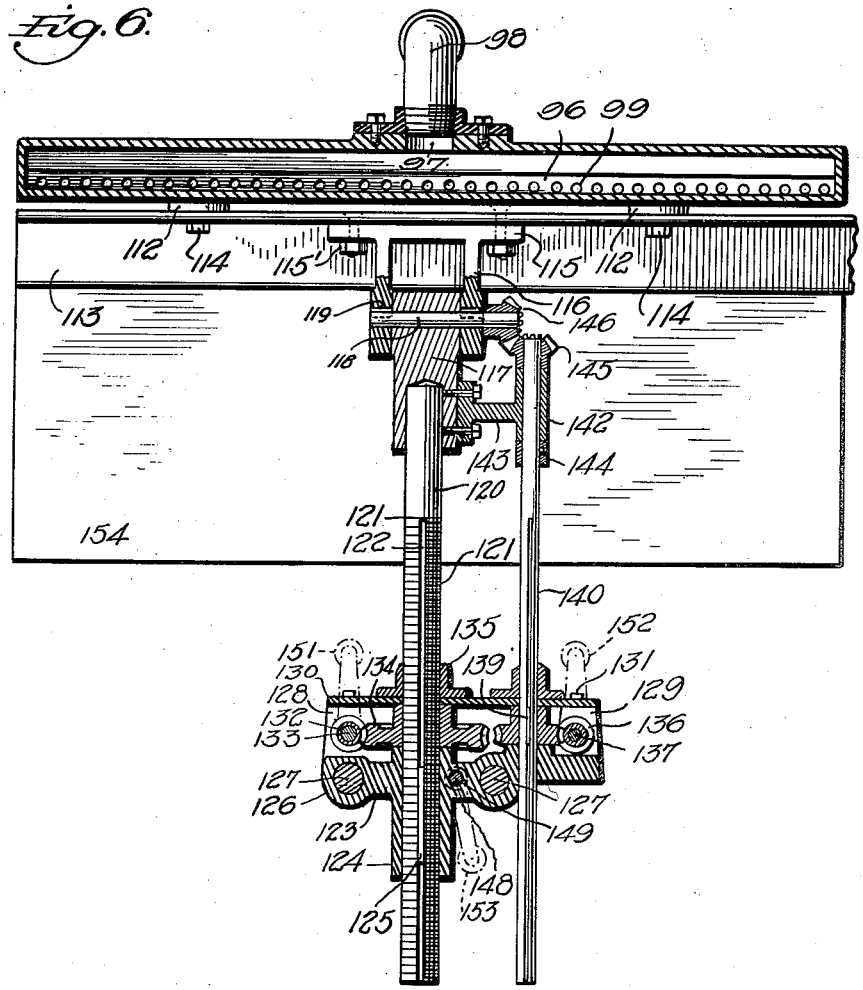
Figure 7:
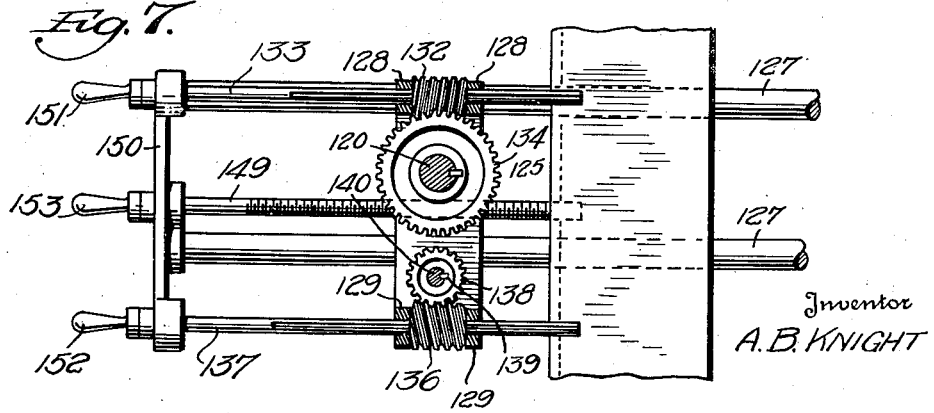

Figure 3 is an enlarged fragmentary horizontal sectional view on line 3—3 of Figure 2, Figure 4 is an enlarged vertical fragmentary sectional view on line 4—4 of Figure 1, parts being broken away, Figure 5 is an enlarged transverse vertical sectional view on line 5—5 of Figure 4, Figure 6 is an enlarged vertical sectional view taken substantially on line 6—6 of Figure 5, Figure 7 is an enlarged horizontal fragmentary sectional view on line 7—7 of Figure 5, and, Figure 8 is a detail sectional view on line 8—8 of Figure 1, parts being omitted.

Referring to the drawings, the numeral 10 designates a pair of supporting frame members preferably formed of spaced parallel inverted U-beam sections, as clearly shown in Figure 5. The members 10 are rigidly connected together at one end by a plate 11 (Figure 4), and at their opposite ends by a plate 12. At intermediate points, the frame members 10 also may be connected to each other by suitable tie plates such as the plate 13 shown in Figures 4 and 5. If desired, axles 14 may be arranged beneath the frame members 10 and secured thereto as at 15, and provided at their ends with wheels 17.

Upper parallel frame members 18 (Figure 5) preferably of angle section are arranged above and parallel to the main frame members 18 and are supported with respect thereto by heavy posts 19. These posts have their upper ends arranged in sockets 20 rigidly secured to the members 18. The ends of the latter members are secured to each other by transverse angles 21 (Figure 2) and by any other suitable transverse connecting means such as tie members 22 as shown in Figure 5.

Trackways are provided for supporting and guiding the conveyor chain to be referred to. These trackways, at one side of the apparatus, are made up of parallel angle sections 23 as shown in Figure 5, the horizontal portions of the trackways being arranged in a common plane with their inner edges spaced from each other. The trackways at the opposite side of the apparatus are formed of angle sections 24 which are similar to the angle sections 23 except that the vertical portions of the trackways are substantially higher for a purpose to be described.

The remote trackway elements 23 and 24 are connected at one end of the apparatus by a semi-circular guard rail indicated by the numeral 25 (Figure 2). The opposite end of the apparatus is provided with a similar semi-circular guard rail 26, the inner ends of which are separate from the remote elements of the trackways 23 and 24 and telescope with respect thereto to move longitudinally of the apparatus when the conveyor chain is adjusted to take up slack, in a manner to be described. The ends of the guard rail 26 are straight for a short distance to coincide with the straight adjacent ends of the trackways to slide with respect thereto.

As previously stated, the trackways 23 and 24 are arranged above the frame members 18, and the trackways may be supported in position in any suitable manner. For example, spaced supports 27 may have their lower ends secured to the frame members 18 and their upper ends secured to the respective sections of the trackways 23 and 24 to rigidly support the latter in proper position.

The conveyor of the present construction comprises a chain formed of a plurality of links 28 each of which has opposite ends spread apart vertically as at 29 to receive the adjacent ends of the next adjacent link, the latter ends being integrally connected by a sleeve portion 30 for engagement with sprockets to be described. The adjacent ends of each adjacent pair of links are connected together by pivot bolts 30'. Intermediate its ends each chain is provided with oppositely extending horizontal lugs 31 (Figure 5) adapted to slide along the horizontal portions of the trackway sections. Each link further carries a sleeve portion 32 intermediate its ends in which is arranged a rotatable spindle 33 carrying an article supporting member or cup 34 at its upper end.

The lower end of each spindle 33 is provided with a pinion 35 which is adapted to mesh with a rack 36 arranged below the plane of the trackway and at the side of the apparatus adjacent the trackway portions 24 (Figure 5). The rack 36 is supported with respect to the adjacent supporting elements 27 by suitable brackets 37. It will be apparent that when they are traveling between the sections of the trackway 24, the spindles 33 will be rotated to impart rotation to the articles supported by the cups 34. It will become apparent that this rotation takes place while the articles are being glazed and polished, and when the spindles are passing around the ends of the apparatus and along the opposite side thereof, no rotation is imparted to the spindles. Each spindle is preferably hollow and contains an ejector rod 38 which is adapted to contact with a lifting cam 39 (Figure 5) to lift the article of glassware from the associated supporting cup 34 to facilitate the removal of the ware. The cam 39 is suitably supported beneath the trackway portions 23.

As shown in Figure 1, opposite ends of the apparatus are provided with vertically extending posts 40 and 41, the former of which has its lower end rigidly mounted in a socket 42 secured to the plate 12. The post 41 has its lower end arranged in a similar socket 43 provided with a lower annular flange 44 having opposite edge portions slidable in guides 45 formed integral with the plate 11. The upper end of the standard 40 is provided with a sprocket wheel 46 freely rotatable thereon, it being understood that the lower end of the post 40 is fixed with respect to the socket 42. The teeth of the sprocket wheel 46 are adapted to drive the conveyor chain by engaging the sleeves 30 thereof, and to support the chain at the corresponding end of the apparatus.

Referring to Figure 8, it will be noted that the sprocket 46 is provided with a relatively heavy cap member 47, which may be integral with or secured to the sprocket, and the cap member 47 receives and is supported by the upper end of the post 40. Below the sprocket 46, a gear 48 is rotatable on the post 40 and is provided with an upwardly extending hub portion 49 secured to the sprocket 46. The cap member 47 obviously acts as a thrust bearing to support the load of the sprocket 46 and gear 48.

A collar 50 is secured to the post 40 and is provided with radial arms 51 secured to the lower inner ends of supporting brackets 52. The upper outer ends of these members are secured to and support the guard rail 25. A guard plate 53 is arranged above the gear 48 and is provided with a semi-circular end secured to the brackets 52. The inner end of the guard plate 53 may be secured to the adjacent ends of the main frames 18.

The post 41 obviously is fixed against rotation by the socket 43 and is provided with a sprocket wheel 54 freely rotatable thereon and engaging the conveyor chain in the same manner as the sprocket 46. The sprocket 46 supports the conveyor chain between the adjacent ends of the trackways 23 and 24. The sprocket 54 also is provided with a cap member 55, similar to the cap member 47, and acting as a thrust bearing to carry the load of the sprocket 54 on the upper end of the post 41. The post 41 is provided with a hub or sleeve 56 having radially extending arms 57 supporting bracket members 58 the outer and upper ends of which are connected to the guard rail 26 to support the latter.

Each link of the conveyor chain is provided with a guard plate 59 and the adjacent ends of the adjacent guard plates are connected by pivot bolts 60 each of which is arranged in vertical alignment with one of the chain link connecting bolts 30. Accordingly the plates 59 are adapted to follow the end curves of the conveyor chain. As previously stated, the vertical flanges of the trackways 24 are higher than the similar portions of the trackways 23, as shown in Figure 5, and the plates 59 are adapted to slide over the vertical flanges of the trackways 24.

It will become apparent that the plates 59, under such conditions, assist in protecting the parts below the plates from the effects of the flames of the burners to be described.

The means for rotating the gear 48 and accordingly driving the conveyor chain is shown in Figures 2 and 3. The plate 12 is utilized as shown in Figure 3 as a support for a motor 61, and the latter is movable longitudinally of the apparatus in parallel guides 62 carried by the plate 12. The motor is provided with a pulley 63 around which passes a V-belt 64. The belt passes around and between a pair of conical drive pulleys 65 urged toward each other by springs 66. The pulleys or cones 65 drive a shaft 67 extending into a suitable reduction gearing 68 which is conventional and preferably of the worm and pinion type. The power take-off shaft 69 of the reduction gearing is provided at its upper end with a pinion 70 meshing with the gear 48.

The variable speed transmission means shown in Figure 3 forms no part per se of the present invention and preferably is of the type shown in my prior Patent No. 2,107,483, granted February 8, 1938. With such a transmission, it will be apparent that the motor 61 is movable toward and away from the axis of the cones 65 to vary the radius of the lines of contact of the belt 64 with the cones, and thus vary the transmission ratio. In the present apparatus, the transmission is preferably variable from a ratio of 1:1 to 1:3. The adjustment of the motor position in the guides 62 is preferably accomplished by rotation of a control shaft 71 having a screw connection (not shown) with the motor 61. The shaft 71 preferably extends to the opposite end of the apparatus at which point it is provided with a control handle 72. This handle may be placed at any desired point, however, but it is preferred that it be arranged in the position shown in order to position it adjacent another control handle to be described.

The apparatus is provided with novel means for taking up slack in the conveyor chain. The plate 11 (Figure 4) is provided with an opening 73 in which is arranged a pair of sprockets 74 and 75 secured to each other. A shaft 76 is threaded in one or both of the sprocket wheels referred to and is slidable in bearings 77 mounted on the plate 11. The end of the shaft 76 is secured as at 78 to the flange 44. Accordingly it will be apparent that rotation of the sprockets 74 and 75 effects longitudinal movement of the shaft 76 and thus moves the flange 44 in the guides 45.

A bearing bracket 79 is supported by the plate 11 and has a bearing 80 at its upper end supporting a horizontal shaft 81 (Figures 4 and 5). One end of the shaft 81 is provided with a crank handle 82 and the other end is provided with a sprocket 83. A chain 84 passes around the sprocket 83 and around the sprocket 74. Accordingly operation of the crank handle 82 results in movement of the shaft 76 for the purpose stated.

A transverse support 85 (Figure 5) is secured at its ends to angle brackets 86 which, in turn, are secured to plates 87. These plates are carried by angle brackets 88 secured to the inner frame elements of the trackways 23 and 24. The support 85 is provided centrally thereof with a bearing 89 receiving the horizontal shaft 90 which is slidable in the bearing 89 and connected at one end as at 91 to the cap 55 (Figure 4). The other end of the shaft 90 is threaded in a sprocket 92 around which passes a chain 93, and as shown in Figure 4, this chain passes around the sprocket 75. Thus rotation of the sprockets 74 and 75 is transmitted to the sprocket 92, and accordingly the shafts 76 and 90 will be simultaneously moved upon operation of the crank handle 82. Thus the upper and lower ends of the post 41 are simultaneously adjusted longitudinally of the apparatus, and since the sprocket 54 is carried by the post 41, the adjustment referred to is adapted to take up slack in the conveyor chain, which passes around the sprocket 54.

A plurality of inner burners 94 and a plurality of outer burners 95 are arranged on opposite sides of the run of the conveyor chain which is supported by the trackways 24. These burners are identical with each other and only one need be referred to in detail. The burners are preferably formed of cast iron and each is provided with a substantially fan shaped manifold 96 to which an explosive gaseous mixture is supplied through an opening 97 (Figure 6) by means of a pipe 98. The portion of each burner facing toward the adjacent series of supporting cups 34 is provided with a series of apertures 99 in which are arranged suitable burner tips for projecting substantially cylindrical flames.

Each pipe 98 is preferably one end of an elbow and the other end of each of these elbows associated with the burners 95 is connected to one end of a relatively short pipe section 100 as shown in Figure 5. The other ends of the elbows 98 associated with the burners 94 are connected to similar pipe sections 101 which are substantially longer than the pipe section 100 to extend to the farther side of the apparatus. The outer ends of the pipe sections 100 and 101 are connected to elbows 102 leading to short pipe sections 103 which are angularly arranged as clearly shown in Figure 2. The pipe sections 103 are provided with couplings 104 for connecting them to flexible hoses 105 which are looped as shown in Figure 2 and have their lower ends extending inwardly at an angle for connection with valves 106. Each of these valves has connection as at 107 with a manifold 108, there being one manifold at each side of the apparatus to supply gaseous fuel to each of the associated flexible connections 105.

Each manifold 108 is supplied with gaseous fuel by means of an air and gas mixer 109, preferably of the centrifugal type having its tangential discharge directly connected to the end of the associated manifold. The mixers 109 are preferably of the type shown in my prior Patent No. 1,667,074, granted April 24, 1928. Each mixer 109 is driven by a suitable motor 110 (Figure 5) and each motor and its associated mixing blower are preferably carried by a support 111 secured to the plate 13.

The means for supporting and adjusting the burners forms one of the most important parts of the present invention. Referring to Figures 4, 5 and 6, the lower face of each burner is provided with a pair of attaching bosses 112 to which is secured the horizontal flange of a support 113, preferably formed of angle section and extending throughout the length of the burner. Bolts 114 are employed for securing the support 113 to the burner. Intermediate its ends each support is provided with a base member 115 secured thereto as at 115' and provided with a pair of depending arms 116. These arms receive therebetween the upper end of a head 117, as clearly shown in Figure 6. A shaft 118 extends through the head 117 and through the arms 116 and is keyed to the latter as at 119. Accordingly it will be apparent that swinging movement of the shaft 118 will tilt the burner on the axis of the shaft.

The head 117 is mounted on the upper end of a supporting shaft 120 the lower portion of which is threaded as at 121 and provided with a spline groove 122. The lower end of the shaft 120 extends downwardly through a crosshead 123 which has an integral sleeve portion 124 in which the shaft 120 is slidable. The sleeve 124 carries a spline 125 mounted in the groove 122 to prevent rotation of the shaft 120 on its axis while permitting the shaft to move vertically. The crosshead 123 is provided with a pair of spaced bearings 126 slidably receiving supporting rods 127 extending through and supported by the frame members 18. The crosshead is caused to slide on the supporting rods 127, in a manner to be described, to move the burner transversely with respect to the line of supporting cups 34 passing between the rows of burners.

The crosshead 123 is provided in one side as viewed in Figure 6 with a pair of spaced upstanding integral arms 128, and the opposite side of the crosshead is provided with a similar pair of arms 129. A top plate 130 is secured to the upper ends of the arms 128 and 129 as at 131. A worm 132 is arranged between the arms 128 and is splined on a shaft 133 extending through the arms 128. The worm 132 meshes with a worm wheel 134 in which the shaft 120 is threaded. It will be apparent that the hub of the worm wheel 134 is limited in its downward movement by the upper end of the sleeve 124 of the crosshead, and has its upper end contacting with the plate 130. A collar 135 may be secured to the upper face of the plate 130 to slidably receive the shaft 120. Rotation of the worm 132 rotates the worm wheel 134, and since the shaft 120 is fixed against rotation, vertical movement of the shaft will be effected.

A second worm 136 is mounted between the arms 129 and is splined on a shaft 137 extending through the arms 129. The worm 136 meshes with a worm wheel 138 splined as at 139 on a vertical shaft 140. This shaft is rotatable in the crosshead 123 and in a collar 141 secured to the upper face of the plate 130. The upper end of the shaft 140 is journaled in a bearing 142 carried by a bracket 143 secured to the head 117. A thrust collar 144 is secured to the shaft 140 below the bearing 142, and above this bearing a bevel gear 145 is carried by the shaft 140 and meshes with a similar bevel gear 146 carried by the shaft 118.

As previously stated, each crosshead 123 is slidable on the supporting rods 127 and it will be apparent that the rods 127 are fixed while means is provided for transmitting movement to each crosshead. The rods 127 may be fixed against movement in any suitable manner, and in Figure 5, the rods are shown as being engaged by set screws 147 threaded in the frame members 18. The crosshead is provided with a threaded opening 148 in which is mounted the threaded portion of a shaft 149. Since this shaft is fixed against longitudinal movement, it will be apparent that rotation of the shaft will cause the crosshead 123 to slide on the rods 127.

It will be apparent that a pair of supporting rods 127 is provided for each opposite pair of burners 94 and 95, and accordingly each pair of supporting rods carries two of the crossheads 123 with their associated operating mechanisms. A bearing block 150 is arranged adjacent each side of the apparatus for each pair of supporting rods 127, these rods extending through and being fixed to the bearing blocks 150 and forming the sole supporting means therefor. Each of the shafts 133, 137 and 149 of each crosshead 123 extends outwardly from the latter through the associated bearing block 150, and outwardly of the bearing block, these shafts are respectively provided with crank handles 151, 152 and 153, as clearly shown in Figure 7. It will become apparent that rotation of the handle 153 moves the associated crosshead transversely of the apparatus, the worms 132 and 136 being splined on their respective shafts to permit such movement. It also will become apparent that rotation of the handle 151 changes the elevation of the burner by raising and lowering the shaft 120, and that rotation of the handle 152 causes the burner to swing about the axis of the shaft 118, thus tilting the burner at the desired angle.

As shown in Figures 5 and 6, shields 154 are provided to assist in protecting working parts of the apparatus from damage by the flames of the burners. It is particularly desirable to prevent the burners, when tilted, from directing flames across the operating run of the conveyor chain and against such parts as the bevel gears 145 and 146 and their associated parts. The shields 154 accordingly are provided, each shield preferably being coextensive in length with its associated burner and being connected to the associated burner support 113 by hooks 155 whereby the shield is free to swing and thus remain in a vertical position, regardless of the angular position of the burner.

The operation of the apparatus is as follows:

The motor 61 is placed in operation to drive the gear 48 through the speed reducer 68 and through the variable speed transmission comprising the cones 65. The rod 71 is rotated to move the motor toward or away from the axis of the cone to provide the desired driving ratio, depending upon the type of ware being worked upon and the consequent time required for the operation on each article. The apparatus is designed to glaze and polish small articles of glassware at a rate of speed up to 60 per minute, and if a variable speed transmission of the type referred to is employed, the motor 61 may be moved toward the axis of the driving cones to provide a 1:3 driving ratio, in which case the speed of production of the apparatus may be reduced to 20 per minute for larger articles of glassware.

The gear 48 is rotated in the manner described and since this gear is connected to the sprocket 46, it will be apparent that this sprocket directly drives the conveyor chain. The links of the chain are caused to pass around the sprockets 46 and 54, both sprockets supporting the chain at the ends of the apparatus with the sprocket 46 acting as the driving sprocket and the sprocket 54 as an idling sprocket. The links of the chain are supported between the sprockets by engagement of the outstanding lugs 31 with the horizontal portions of the rail sections 23 and 24. During movement of the chain between the sets of burners, the ware will be subjected to the action of the burners in a manner to be described to glaze and polish the ware. The vertical flanges of the trackways 24 contact or substantially contact with the plates 59, as shown in Figure 5, thus forming a closed channel through which the chains pass and providing protection for the parts against the heat of the burners. When the chain passes around to the opposite side of the apparatus, the cam 39 (Figure 5) lifts the ejecting stem 38 of each successive chain link, thus assisting in removing the articles from the cups 34.

It will be apparent that each link of the portion of the chain supported by the trackways 24 will have its spindle 33 constantly rotated on its axis by engagement of the pinion 35 with the rack 36, thus uniformly subjecting each article of glassware to the action of the different burners. This assists in providing a perfect glazing and polishing operation.

Any slack in the conveyor chain readily may be taken up by rotating the crank handle 82 (Figure 4). This operation causes the chain 84 to rotate the sprocket 74 to move the socket 43 longitudinally with respect to the apparatus. This operation is exactly duplicated by transmitting movement from the sprocket 75 to the sprocket 92 through the chain 93, thus causing the shaft 90 to move the cap longitudinally to an extent exactly equal to the movement of the socket 43. Thus the post 41 is relieved of any undue or uneven strain due to the tension of the chain against the sprocket 54.

One of the blowers 109 is provided for the burners at each side of the apparatus and each blower is driven by its associated motor 110. The blower is preferably of the type shown in my prior Patent No. 1,667,074, referred to above, this apparatus forming a particularly efficient charge forming apparatus for providing an adequate supply of a thoroughly homogeneous gas mixture to the burners. Each charge forming device forces the gaseous mixture to its associated manifold 108 for distribution to the corresponding burners 94 or 95.

With prior machines for glazing and polishing glassware, the natures of the machines were such as to greatly limit their use with glassware of different types and sizes. In other words, a machine designed for glazing and polishing tumblers would be practicable for use with tumblers varying in size within reasonable limits but would be useless for glazing flat ware such as plates and the like. The present apparatus is highly practicable for use in glazing and/or polishing glassware regardless of its shape and for polishing ware of greatly different sizes.

Each of the burners 94 and 95 is capable of partaking of three different adjustments so as to take care of glassware of different heights and shapes. For example, assuming that tumblers are to be both glazed and polished, two of the burners, as shown in solid lines in Figure 5, may be horizontally arranged and adjusted as to height to project flames across the top edge of the ware to glaze the edge thereof. Others of the burners may be arranged at the same height and inclined to project flames downwardly to the sides of the tumblers, while still others of the burners may be arranged at lower heights to project flames against the lower portions of the sides of the tumblers, with the flames projected either horizontally or at an angle, depending upon the individual articles. Similarly, for different types of ware, such as stem ware, plates, etc., the burners may be adjustable as to height, angle and distance from the ware in accordance with the individual requirements of the ware.

The various adjustments of the burners are very readily effected by operation of the three handles 151, 152 and 153. For example, assuming that it is desired to glaze the edges of tumblers which are shorter or taller than the tumblers for which the machine has been previously set, the handle 151 may be turned to rotate the shaft 133, whereupon rotation of the worm 132 will rotate the worm wheel 134 and thus move the shaft 120 vertically to a different position.

If the ware for which the machine is being adjusted is of different diameter than that to which the machine has been previously adjusted, each burner may be readily adjusted to be moved horizontally toward or away from the ware by turning the corresponding handle 153. Rotation of the threaded shaft 149 will then move the corresponding crosshead 123 horizontally in the desired direction to increase or decrease the distance of the burner from the axis of the ware. Accordingly the burners may be arranged at any desired distance from the surfaces of the articles to provide the most efficient results.

It usually is desirable in fire polishing the sides of tumblers to tilt the burners at an angle and such position of the burners, of course, is necessary when polishing bowls, plates, etc. Each of the burners is readily adapted to be tilted on the axis of its shaft 118 by rotating the associated handle 152. This operation rotates the shaft 137 and its associated worm 136, thus rotating the shaft 140 and transmitting a rocking movement to the shaft 118 through gears 145 and 146. The arms 116 are keyed to the shaft 118, and accordingly the burner will be tilted to an angular position corresponding to the angular turning of the shaft 118.

Thus any desired angular adjustment of the burners may be obtained; each burner may be arranged at any desired distance from the ware, and each may be adjusted to the necessary height for performing its desired operation. It will be apparent that the splining of the shaft 140 to the worm wheel 138 permits the free vertical adjustment of each burner without affecting the mechanism by which the burner is tilted. Moreover, the splining of the worms 132 and 136 on their respective shafts 133 and 137 permits horizontal adjustment of each crosshead 123 on its supporting rods 127. Thus each adjusting operation is freely performed without interfering with the mechanism through which other adjusting operations are performed. The flexible hoses 105, of course, permit the free adjustment of the burners in the manner described. All of the adjusting handles are arranged externally of the apparatus, and all are readily accessible to the operator without the operator being subjected to any substantial amount of heat from the burners.

It will be noted that the support 113 of each burner is provided with one of the shields 154 which extends throughout the length of the burner. The shields 154 hang freely from the hooks 155 and accordingly the shields remain in vertical position. Thus it will be apparent that when certain of the burners are tilted to the dotted line position shown at the left side of Figure 5, the associated shields 154 will remain in vertical position. These shields effectively prevent the flames from the burners on the opposite side of the conveyor chain from being projected below the associated burner supports to cause injury to the adjusting mechanism for the burners. For example, with an angularly adjusted burner as shown in dotted lines at the left of Figure 5, the flames from the burner jets will be projected against the ware moving past the burner and will be projected between the glass articles. These flames would project destructive heat to the bevel gears 145 and 146 and associated parts, but such parts are effectively protected by the vertically hanging shields 154.

The use of a battery of burners, each capable of partaking of the three adjustments referred to, provides a highly efficient glazing and polishing apparatus with a high production rate. As previously stated, the apparatus may be and has been designed to glaze and/or polish articles of glassware up to 60 articles per minute, and this substantial rate of production may be maintained regardless of the shape of the ware. Of course, articles of larger sizes require a somewhat longer period of time for passing between the burners, in which case the variable transmission (Figure 3) is adjusted to retard the speed of movement of the chain. In any event, the production rate is relatively rapid, the rate being dependent upon the size but not the shape of the articles.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A glass working machine comprising a burner, means for moving an article of glassware past said burner, a threaded vertical post to the upper end of which said burner is connected, a crosshead arranged adjacent the lower end of said post and splined thereto to prevent rotation of said post, a rotatable member carried by said crosshead and fixed against vertical movement thereby, said rotatable member being threaded on said post whereby rotation of such member varies the height of said burner with respect to the ware, and a pair of horizontal bars extending transversely of the path of movement of the ware and supporting said crosshead for sliding movement to vary the distance of said burner from the ware.

2. A glass working machine comprising a burner, means for moving an article of glassware past said burner, a threaded vertical post to the upper end of which said burner is connected, a crosshead arranged adjacent the lower end of said post and splined thereto to prevent rotation of said post, a worm wheel rotatably supported by said crosshead and fixed thereby against vertical movement, said worm wheel being threaded on said post whereby rotation of said worm wheel will move said post vertically and vary the height of said burner with respect to the ware, a manually rotatable worm meshing with said worm wheel, and a pair of horizontal rods extending transversely of the path of movement of the ware and slidably supporting said crosshead to vary the distance of the burner from the ware.

3. A glass working machine comprising a burner, means for moving an article of glassware past said burner, a threaded vertical post to the upper end of which said burner is connected, a crosshead arranged adjacent the lower end of said post and splined thereto to prevent rotation of said post, a worm wheel rotatably supported by said crosshead and fixed thereby against vertical movement, said worm wheel being threaded on said post whereby rotation of said worm wheel will move said post vertically and vary the height of said burner with respect to the ware, a manually rotatable worm meshing with said worm wheel, and a pair of horizontal rods extending transversely of the path of movement of the ware and slidably supporting said crosshead, and a shaft arranged parallel to said rods and threaded in said crosshead whereby rotation of said shaft will move said crosshead on said rods and vary the distance of said burner from said ware.

4. A glass working machine comprising a burner, means for moving an article of glassware past said burner, a threaded vertical post to the upper end of which said burner is connected, a crosshead arranged adjacent the lower end of said post and splined thereto to prevent rotation of said post, a worm wheel rotatably supported by said crosshead and fixed thereby against vertical movement, said worm wheel being threaded on said post whereby rotation of said worm wheel will move said post vertically and vary the height of said burner with respect to the ware, a pair of horizontal supporting rods extending transversely of the path of travel of the ware, a shaft arranged parallel to said rods and fixed against axial movement, said shaft being threaded in said crosshead whereby rotation of said shaft will move said crosshead on said rods and vary the distance of said burner from the ware, a second shaft fixed against axial movement, and a worm meshing with said worm wheel and splined on said second shaft, said second shaft being rotatably carried by and movable with said crosshead.

5. A glass working machine comprising a burner, means for moving an article of glassware past said burner, a threaded vertical post to the upper end of which said burner is connected to swing on a pivot parallel to the direction of movement of the ware, a crosshead arranged adjacent the lower end of said post and splined thereto to prevent rotation of said post, a wheel rotatably supported by said crosshead and fixed against vertical movement thereby, said wheel being threaded on said post whereby rotation of said wheel will move said post vertically to vary the height of said burner with respect to the ware, means connected to move said crosshead transversely of the path of movement of the ware to vary the distance of the burner therefrom, and operating connections movable with said post and said crosshead laterally of the path of movement of the ware for turning said burner about its pivot to vary the angle of the burner flames with respect to the ware.

6. A glass working machine comprising a burner, means for moving an article of glassware past said burner, a threaded vertical post to the upper end of which said burner is connected to swing on a pivot parallel to the direction of movement of the ware, a crosshead arranged adjacent the lower end of said post and splined thereto to prevent rotation of said post, a wheel rotatably supported by said crosshead and fixed against vertical movement thereby, said wheel being threaded on said post whereby rotation of said wheel will move said post vertically to vary the height of said burner with respect to the ware, means connected to move said crosshead transversely of the path of movement of the ware to vary the distance of the burner therefrom, operating connections movable with said post and said crosshead laterally of the path of movement of the ware for turning said burner about its pivot to vary the angle of the burner flames with respect to the ware, and a plurality of operating handles arranged adjacent each other and connected respectively for operating said operating connections, for moving said crosshead, and for rotating said wheel.

7. A glass working machine comprising a pair of burners each provided with a plurality of aligned burner nozzles directed inwardly toward each other, means for conveying an article of glassware between said burners and past said nozzles, a vertical supporting post for each burner, a supporting crosshead for each post, independently operable controlling means carried by each crosshead for controlling the height of each burner with respect to the ware, each burner being pivotally supported on the upper end of its associated post on an axis parallel to the line of movement of the ware, independently operable means for tilting said burners on their pivot axes, and pivoted shields carried by said burners and depending from the inner edges thereof on opposite sides of the path of movement of the ware.

8. A glass working machine comprising a burner having a plurality of burner nozzles, means for moving an article of glass ware past said burner, a movable supporting crosshead, a supporting member carried by said crosshead for movement relative thereto and having said burner pivotally connected thereto substantially centrally of the length of said burner, means for moving said supporting member relative to said crosshead to vary the height of said burner with respect to the ware and with respect to said crosshead to vary the distance of said burner from said ware, and means connected to said crosshead for effecting pivotal movement of said burner to vary the angle of the flames with respect to said ware.

9. A glass working machine comprising a burner having a plurality of burner nozzles, means for moving an article of glass ware past said burner, a movable supporting crosshead, a supporting member carried by said crosshead for movement relative thereto and having said burner pivotally connected thereto substantially centrally of the length of said burner, means for moving said supporting member relative to said crosshead to vary the height of said burner with respect to the ware and with respect to said crosshead to vary the distance of said burner from said ware, controlling mechanism for effecting tilting movement of said burner to vary the angle of the flames with respect to the ware, and a member connecting said mechanism to said supporting member, said controlling mechanism being connected to said crosshead for movement relative thereto whereby relative movement of said supporting member with respect to said crosshead will be transmitted to said controlling mechanism by said connecting member.

10. A glass working machine comprising a burner having a plurality of burner nozzles, means for moving an article of glassware past said burner, a movable supporting crosshead, a supporting member carried by said crosshead for movement relative thereto and having said burner pivotally connected thereto substantially centrally of the length of said burner, means for moving said supporting member relative to said crosshead to vary the height of said burner with respect to the ware, means for moving said crosshead and said supporting member laterally to vary the distance of said burner from the ware, means for tilting said burner to vary the angle of the flames with respect to the ware comprising a driven bevel gear rigidly connected to said burner, a drive shaft carried by said crosshead for relative movement with respect thereto, a bevel gear connected to said drive shaft meshing with said driven bevel gear, means for driving said drive shaft to effect tilting movement of said burner, and a member connecting said drive shaft to said supporting member whereby said drive shaft will be movable with said supporting member relative to said crosshead.

11. A glass working machine comprising a burner having a plurality of burner nozzles, means for moving an article of glassware past said burner, a movable supporting crosshead, a supporting member carried by said crosshead for movement relative thereto and having said burner pivotally connected thereto substantially centrally of the length of said burner, means for moving said supporting member relative to said crosshead to vary the height of said burner with respect to the ware, means for moving said crosshead and said supporting member laterally to vary the distance of said burner from the ware, means for tilting said burner to vary the angle of the flames with respect to the ware comprising a driven bevel gear rigidly connected to said burner, a drive shaft, a driven bevel gear on said drive shaft meshing with said driven bevel gear, a worm wheel splined to said drive shaft and fixed against vertical movement with respect to said crosshead, a member anchoring said drive shaft to said supporting member whereby said drive shaft will be movable with said supporting member relative to said crosshead, a worm meshing with said worm wheel, and a drive shaft splined to said worm, said worm being carried by and movable with said crosshead.

12. A glass working machine comprising a burner, means for moving an article of glassware past said burner, a threaded vertical post to the upper end of which said burner is connected, a crosshead arranged adjacent the lower end of said post and splined thereto to prevent rotation of said post, a rotatable member carried by said crosshead and fixed against vertical movement thereby, said rotatable member being threaded on said post whereby rotation of such member varies the height of said burner with respect to the ware, and means extending transversely of the path of movement of the ware and supporting said crosshead for sliding movement to vary the distance of said burner from the ware.

13. A glass working machine comprising a pair of burners each provided with a plurality of burner nozzles directed inwardly toward each other, means for conveying an article of glassware between said burners and past said nozzles, means for pivotally supporting each burner for turning movement on an axis substantially parallel to the path of travel of the ware to vary the angle at which the flames from the burners are directed against the ware, and pivoted shields carried by said burners and depending from the inner edges thereof on opposite sides of the path of movement of the ware.

ALBERT BREAKENRIDGE KNIGHT.